United States Patent
Sevindik

(10) Patent No.: US 12,052,123 B2
(45) Date of Patent: Jul. 30, 2024

(54) METHODS AND APPARATUS FOR DYNAMICALLY CONTROLLING SUBCARRIER SPACING ON A COMMUNICATIONS LINK WITH A MODEM

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 391 days.

(21) Appl. No.: 17/476,438

(22) Filed: Sep. 15, 2021

(65) Prior Publication Data

US 2023/0082569 A1 Mar. 16, 2023

(51) Int. Cl.
*H04L 27/26* (2006.01)
*H04L 5/00* (2006.01)
*H04W 72/23* (2023.01)

(52) U.S. Cl.
CPC ...... *H04L 27/26025* (2021.01); *H04L 5/0048* (2013.01); *H04L 5/0098* (2013.01); *H04W 72/23* (2023.01)

(58) Field of Classification Search
None
See application file for complete search history.

(56) References Cited

U.S. PATENT DOCUMENTS

| | | | | |
|---|---|---|---|---|
| 10,797,762 B1* | 10/2020 | Sung | | H04B 7/0617 |
| 11,197,300 B1* | 12/2021 | O'Neill | | H04W 72/541 |
| 11,375,443 B1* | 6/2022 | Pawar | | H04W 48/18 |
| 2018/0234227 A1* | 8/2018 | Zhang | | H04L 27/26 |
| 2020/0229009 A1* | 7/2020 | Xu | | H04L 5/0091 |
| 2021/0119758 A1* | 4/2021 | Park | | H04W 56/0015 |
| 2021/0360629 A1* | 11/2021 | Ma | | H04W 72/0453 |
| 2022/0085908 A1* | 3/2022 | Shaked | | H04L 27/2646 |
| 2022/0286340 A1* | 9/2022 | Dallal | | H04W 76/19 |
| 2022/0322346 A1* | 10/2022 | Sun | | H04L 5/0053 |
| 2022/0361231 A1* | 11/2022 | Oh | | H04W 72/1268 |
| 2023/0189048 A1* | 6/2023 | Palle Venkata | | H04L 1/1812 370/328 |
| 2024/0057103 A1* | 2/2024 | Hosseini | | H04W 28/0205 |
| 2024/0057141 A1* | 2/2024 | Ryu | | H04W 72/40 |

* cited by examiner

*Primary Examiner* — Bob A Phunkulh
(74) *Attorney, Agent, or Firm* — Straub & Straub; Michael P. Straub; Stephen T. Straub

(57) ABSTRACT

Methods and apparatus for determining and adjusting subcarrier spacing (SCS) to be used by a base station, e.g., a CBSD, for transmitting downlink data to one or more wireless devices, e.g., UEs, are described. A subcarrier spacing (SCS) level to be used by the base station is determined based on information relating to buffering of downlink data supplied to the base station via a cable, e.g., data accumulation rate (DAR) and/or average data arrival time (ADAT). Measured cable modem (CM) to base station latency is also used in the SCS determination. The amount of time for which a determined SCS level is to be used by the base station is set based on measured latency between a CMTS and the CM.

20 Claims, 8 Drawing Sheets

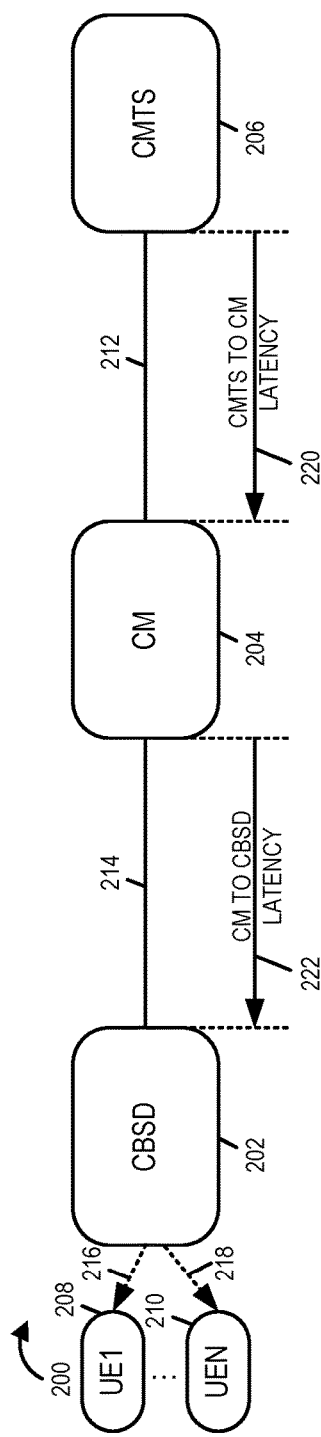
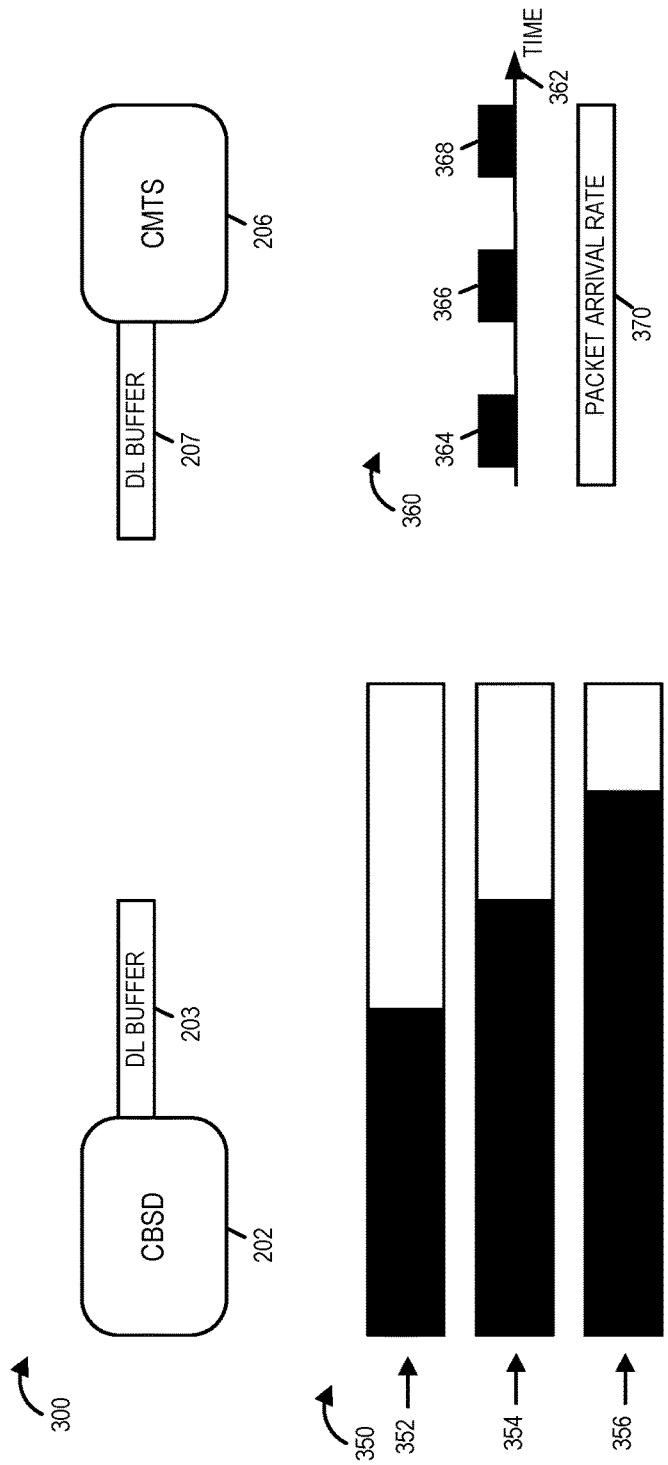
FIGURE 2
FIGURE 3

METHODS AND APPARATUS FOR DYNAMICALLY CONTROLLING SUBCARRIER SPACING ON A COMMUNICATIONS LINK WITH A MODEM

FIELD

The present application relates to wireless communications, and more specifically, to controlling and adjusting subcarrier spacing (SCS) based on cable network latency to achieve efficient base station operation.

BACKGROUND

The use of a cable and modem to deliver data to a base station can be a cost effective approach to communicating data to/from a base station in at least some deployments. However, as wireless systems begin to support low latency applications the latency introduced by the use of a cable and modem to communicate data between a network and base station can be of concern. This is particularly the case where low latency applications are to be supported by a wireless device which communicates via the base station and cable/modem with a network device.

However, in cases where a cable/modem link is lightly loaded latency may not be a problem. However, as the cable and modem become more heavily loaded latency may increase potentially making the modem/cable portion of a connection unpredictable as to the amount of latency that it will introduce. Thus, in at least some such cases, the latency introduced by the use of a cable and modem may add undesired amounts of latency to data communication which are intended to have an overall low latency between a wireless device sending or receiving data and the source or intended recipient of the data. This can be of particular concern where cables and/or modems are based on a Data Over Cable Service Interface Specification (DOCSIS) standard since currently latency tends to increase with load over a link in such systems.

One promise of 5G (Fifth Generation) wireless mobile networks is an overall low communications latency. Pairing a 5G base station with a communications link with unpredictable can make it difficult to meet latency expectations for at least some applications.

In view of the importance of supporting low latency applications there is a need for methods and/or apparatus which would allow for the variability of cable/modem latency to be taken into consideration by a base station and which would allow a base to take one or more steps to compensate for the latency of the cable latency as the cable latency increases.

SUMMARY

In various embodiments information relating to data accumulation, data arrival and/or latency are used by a base station in determining subcarrier spacing (SCS) to be used for transmitting data received via a communications path including a cable and modem.

In some embodiments the base station measures or estimates a data accumulation rate and/or data arrival times at the base station with respect to data delivered via a cable and modem. Such measured information is affected by the latency of the cable/modem link to the base station. The base station then adjustments, e.g., modifies subcarrier spacing used for wireless transmissions of data delivered via the cable/modem based on the measurements or estimates. In this way the base station can modify the latency over the wireless link through subcarrier spacing adjustments to compensate and/or offset changes in latency over the cable modem thereby increasing the predictability of the overall communications latency. This facilities providing of data communications which can provide predictable latency which is more likely to satisfy 5G latency expectations than systems which do not try to take into consideration the effect of a cable and modem connection on overall communications latency.

Methods and apparatus for determining and adjusting subcarrier spacing (SCS) to be used by a base station for transmitting downlink data to one or more wireless devices are described. A subcarrier spacing (SCS) level to be used by the base station is determined based on information relating to buffering of downlink data supplied to the base station via a cable, e.g., measured or calculated data accumulation rate (DAR) and/or measured or calculated average data arrival time (ADAT). Measured cable modem (CM) to base station latency is also used in the SCS determination. The amount of time for which a determined SCS level is to be used by the base station is set based on measured latency between a CMTS and the CM.

An exemplary method of operating a base station, in accordance with some embodiments, comprises: determining information relating to buffering of downlink data supplied by said cable, said information including one or both of: i) a data accumulation rate (DAR) of a downlink buffer used to store downlink data supplied by said cable and ii) an average data arrival time (ADAT) of the downlink buffer; determining, at the base station, a subcarrier spacing (SCS) to be used by the base station to transmit data to one or more wireless devices based on the determined (416) information relating to buffering of downlink data supplied by said cable; and using the determined SCS to transmit data stored in the downlink buffer to one or more wireless devices.

An exemplary base station, in accordance with some embodiments, comprises: a processor configured to: determine information relating to buffering of downlink data supplied by said cable, said information including one or both of: i) a data accumulation rate (DAR) of a downlink buffer used to store downlink data supplied by said cable and ii) an average data arrival time (ADAT) of the downlink buffer; determine, at the base station, a subcarrier spacing (SCS) to be used by the base station to transmit data to one or more wireless devices based on the determined information relating to buffering of downlink data supplied by said cable; and operate the base station to use the determined SCS to transmit data stored in the downlink buffer to one or more wireless devices.

Numerous variations on the described methods and apparatus are possible and while several embodiments are described in detail is should be appreciated that the full set of detailed steps need not be used in all embodiments with many of the features and determinations being useful even if not used with the other features and steps.

The detailed description which follows describes additional features, details and embodiments which can be used alone or in combination.

BRIEF DESCRIPTION OF THE FIGURES

FIG. 2 is drawing illustrating a portion of exemplary communication of FIG. 1 and further illustrating CMTS to CM latency and CM to CBSD latency.

FIG. 3 is drawing illustrating exemplary downlink buffers for a CMTS and a CM, different exemplary levels of DL buffer fullness, and exemplary packet arrival times, used to derive a packet arrival rate.

DETAILED DESCRIPTION

Figure 1:
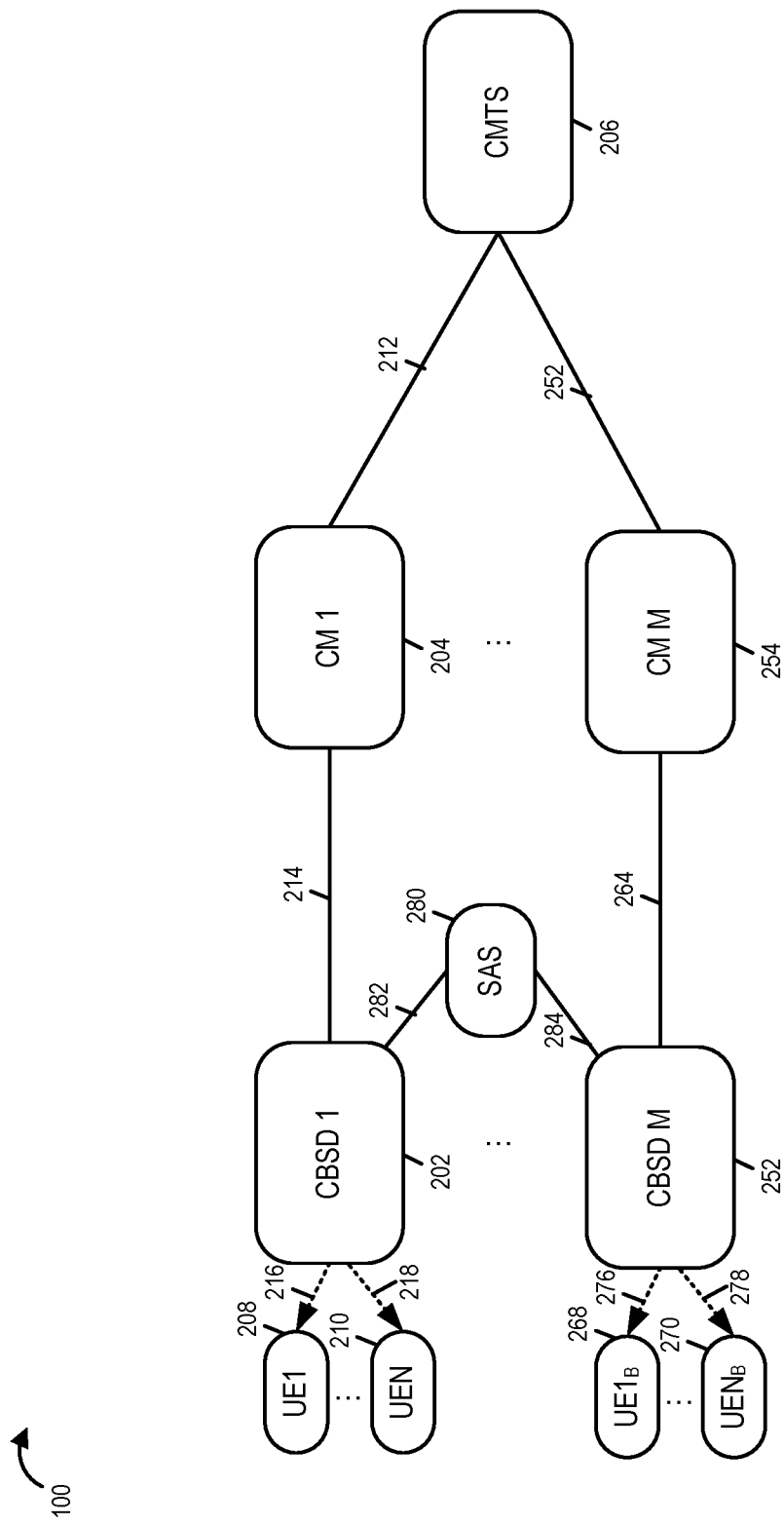
FIG. 1 is a drawing of an exemplary communications system in accordance with an exemplary embodiment.

FIG. 1 is a drawing of an exemplary communications system 100 in accordance with an exemplary embodiment. Exemplary communications system 100 includes a plurality of base stations (Citizens Broadband Radio Services Device 1 (CBSD 1) 202, . . . , CBSD M 252), a plurality of cable modems (cable modem 1 (CM1) 204, . . . , CM M 254), a cable modem termination system (CMTS) 206, a spectrum access system (SAS) 280, and a plurality of user equipment devices (UE 1 208, . . . , UE N 210, UE 1B 268, . . . UENB 270) coupled together as shown. CMTS 206 is coupled to CM1 204 and CM M 254, via communications links (212, 252), respectively. Communication links (212, . . . , 254) are, e.g., cables, e.g. coaxial cables or fiber optic cables. CM 1 104 is coupled to CBSD 1 202 via communications link 214. CM M 254 is coupled to CBSD M 252 via communications link 264. SAS 280 is coupled to CBSD 1 202 and CBSD M 252 via communications links 282, 284, respectively. CBSD 1 202 is coupled to UE 1 208 and UE N 210 via wireless communications links 216, 218, respectively. CBSD M 252 is coupled to UE 1B 268 and UE NB 270 via wireless communications links 276, 278, respectively. In some embodiments, the cable modems (CM 1 204, . . . , CM M 254) are Data Over Cable Service Interface Specification (DOCSIS) cable modems.

FIG. 2 is a drawing 200 illustrating a portion exemplary communications system 100 of FIG. 1 including cable modem termination system (CMTS) 206, cable modem (CM) 204, CBSD 202, and a plurality of user equipment (UE) devices (UE 1 208, . . . , UE N 210) coupled together as shown. CMTS 206 is coupled to CM 204 via communication link 212. CM 204 is coupled to CBSD 202 via communications link 214, e.g., a coaxial or fiber optic cable. UE 1 208 is coupled to CBSD 202 via wireless communications link 216. UE N 210 is coupled to CBSD 202 via wireless communications link 218. Drawing 200 of FIG. 2 further illustrates CMTS to CM latency 210 for the transmission of downlink data from CMTS 206 to CM204 and CM to CBSD latency 208 for the transmission of downlink data from CM 204 to CBSD 202.

FIG. 3 includes a drawing 300 illustrating downlink (DL) buffers (203, 207) included as part of devices (CBSD 202, CMTS 206), respectively. FIG. 3 further includes a drawing 350 illustrating exemplary different levels of DL buffers fullness, represented by rectangles (352, 354, 356), in which the level of DL buffer fullness is represented by the portion of the rectangle (352, 354, 356) with black shading. FIG. 3 further includes drawing 360 which illustrates exemplary DL data packets (364, 366, 368) arriving at different times along time axis 362. A packet arrival rate 368 for a receiving device, e.g. for CM 204 or CBSD 208, is calculated or determined based on times at which the packets (364, 366, 368) arrive at the receiving device. In accordance with a feature of various embodiments, the CBSD determines a subcarrier spacing (SCS) value to use for downlink signaling to a UE, e.g. UE 1 208 or UE N 210, based on latency information, e.g. CMTS to CM latency 220 and/or CM to CBSD latency 222, and/or DL buffer information, e.g. CBSD downlink (DL) buffer 203 fullness and/or CMTS DL buffer 207 fullness.

Figure 4:
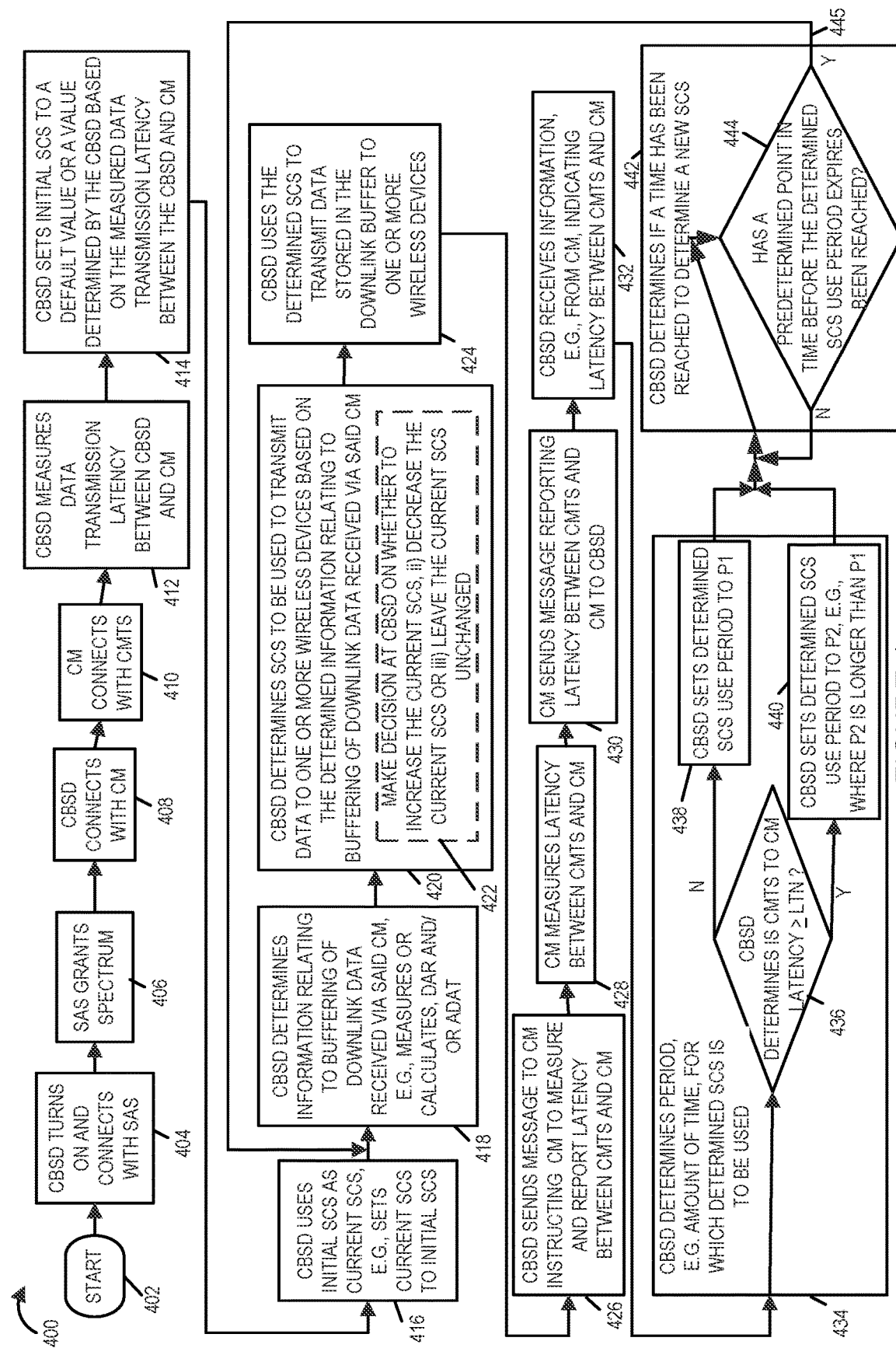
FIG. 4 is a flowchart of an exemplary method of operating a communications system including a Citizens Broadband Radio Services Device (CBSD), coupled to a cable modem (CM), e.g., a DOCSIS cable modem, in accordance with an exemplary embodiment.

FIG. 4 is a flowchart 400 of an exemplary method of operating a communications system including a Citizens Broadband Radio Services Device (CBSD) coupled to a cable modem (CM), e.g., a DOCSIS cable modem, in accordance with an exemplary embodiment. The communications system implementing the method of flowchart 400 is, e.g. communications system 100 of Figure.

Operation of the exemplary method starts in step 402 in which a various system elements, e.g. a SAS, a CMTS, and a CM, are powered on and initialized. Operation proceeds from step 402 to step 404. In step 404, a CBSD, e.g. CBSD 1 202, turns on and connects with the SAS, e.g., performing a registration procedure. Once the CBSD is registered with the SAS, the CBSD sends a request for spectrum to the SAS. The SAS receives the spectrum request from the CBSD, and in step 406 grants spectrum to the CBSD in response to the request and sends a response message to the CBSD conveying the grant to the CBSD, said grant including information identifying a frequency range and maximum transmit power information. The CBSD receives the spectrum grant and establishes a wireless network using the allocated spectrum. Operation proceeds from step 406 to step 408.

In step 408 the CBSD connects with the CM, e.g., CBSD 1 202 connects with CM 1 204. Operation proceeds from step 408 to step 410. In step 410 the CM connects with the CMTS, e.g., CMTS 206. Operation proceeds from step 410 to step 412.

In step 412 the CBSD measures data transmission latency between the CBSD and the CM. In some embodiments, the CBSD uses the method of signaling diagram 600 of FIG. 6 to measure the data transmission latency between the CBSD and the CM. Operation proceeds from step 412 to step 414.

In step 414 the CBSD sets initial SCS to a default value or a value determined based on the measured data transmission latency between the CBSD and the CM. Operation proceeds from step 414 to step 416.

In step 416 the CBSD uses initial SCS as current SCS, e.g., sets current SCS to initial SCS. Operation proceeds from step 416 to step 418.

In step 418 the CBSD determines information relating to buffering of downlink data received via the CM, e.g., measures and/or calculates a data accumulation rate (DAR) and/or an average data arrival rate ADAT. The data accumulation rate (DAR), in some embodiments, is a DAR of a downlink buffer used to stored downlink data supplied by a cable, e.g. a CBSD downlink buffer used to store downlink data received via the cable modem. The average data arrival time (ADAT) in some embodiments, is an ADAT of the downlink buffer. Operation proceeds from step 418 to step 420.

In step 420 the CBSD determines a subcarrier spacing (SCS) to be used to transmit data to one or more wireless devices, e.g. UEs, based on the determined information relating to buffering of downlink data received via said CM. In some embodiments, step 420 includes step 422, in which the CBSD makes a decision on whether to: i) increase the current SCS, ii) decrease the current SCS, or iii) leave the current SCS unchanged. Operation proceeds from step 420 to step 424.

In step 424 the CBSD uses the determined SCS to transmit data stored in the downlink buffer of the CBSD to one or more wireless devices, e.g. UEs. Operation proceeds from step 424 to step 426.

In step 426 the CBSD sends a message to the CM instruction the CM to measure and report latency between the CMTS and the CM. Operation proceeds from step 426 to step 428. In step 428 the CM measures latency between the CMTS and CM. Operation proceeds from step 428 to step 430. In step 430 the CM sends a message, reporting latency between the CMTS and the CM, to the CBSD. Operation proceeds from step 430 to step 432.

In step 432 the CBSD receives information, e.g. from the CM, indicating latency between the CMTS and the CM. Operation proceeds from step 432 to step 434.

In step 434 the CBSD determines, based on cable modem termination system (CMTS) to modem (e.g., CM) latency, a period, e.g., an amount of time, for which the determined SCS is to be used. Step 434 includes steps 436, 438 and 440.

In step 436 the CBSD determines if the CMTS to CM latency is greater than or equal to latency threshold value (LTN). If the CBSD determines that the CMTS to CM latency is not greater than or equal to LTN, then operation proceeds from step 436 to step 438, in which the CBSD sets determined SCS use period to first period (P1). However, if the CBSD determines that the CMTS to CM latency is greater than or equal to LTN, then operation proceeds from step 436 to step 440, in which the CBSD sets determined SCS use period to second period (P2), where P2 is longer than P1. In some embodiments, the second period (P2) is multiple minutes in duration. In some embodiments, the first period (P1) is less than two minutes in duration. Operation proceeds from step 438 or step 440 to step 442.

In step 442 the CBSD determines if a time has been reached to determine a new SCS. Step 442 includes step 444, in which the CBSD determines if a predetermined point in time before (e.g., 30 seconds before—allowing for sufficient time for the determination steps to be performed before the new SCS is to be used) the determined SCS use time period expires has been reached. If the predetermined point in time before the determined SCS use time period expires has not been reached, then operation proceeds from the output of step 444 to the input of step 444. However, if the CBSD determines in step 444, that the predetermined point in time before the determined SCS use time period expires has been reached, then operation proceeds from step 444 to step 418, as indicated by arrow 445. In response to determining that a time has been reached to determine a new SCS, the CBSD repeats steps 418 and 420. In step 418 the CBSD determines information relating to buffering of downlink data supplied by the cable, said information including one or both of: i) a data accumulation rate (DAR) of a downlink buffer used to store downlink data supplied by the cable (e.g., base station downlink buffer used to stored downlink data received via the cable mode) and ii) an average data arrive time (ADAT) of the downlink buffer. In step 420 the CBSD determines a subcarrier spacing (SCS) to be used by the CBSD to transmit data to one or more wireless devices based on the determined information relating to buffering of downlink data supplied to the buffer.

Figure 5:
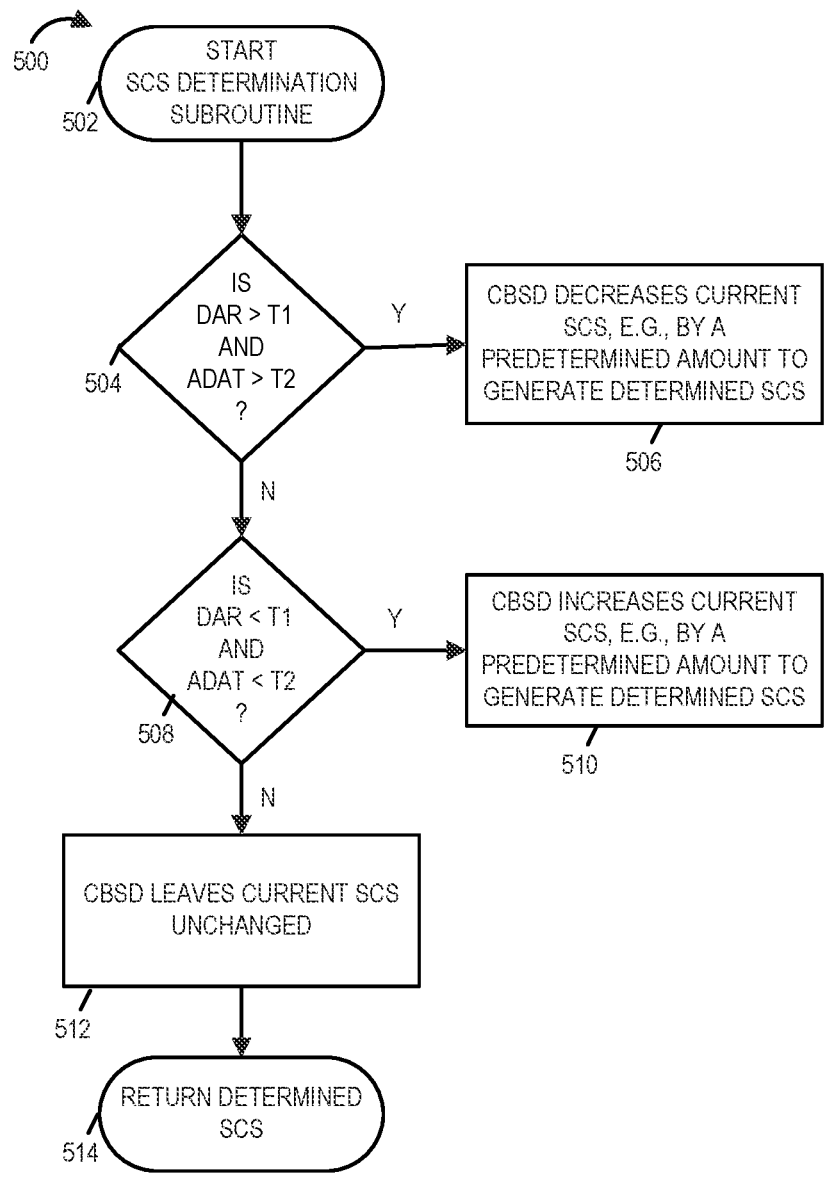
FIG. 5 is a flowchart of an exemplary subcarrier spacing (SCS) determination subroutine which may be implemented by a CBSD, in accordance with an exemplary embodiment.

FIG. 5 is a flowchart 500 of an exemplary subcarrier spacing (SCS) determination subroutine which may be implemented by a CBSD, in accordance with an exemplary embodiment. In some embodiments, CBSD performs the steps of the flowchart 500 of FIG. 5 to implement step 422 of flowchart 400 of FIG. 4, e.g., in response to call to the SCS determination subroutine from step 422.

Operation of the exemplary method of SCS determination starts in step 502 and proceeds to step 504. In step 504 the CBSD determines if DAR is greater than a first threshold T1 and ADAT is greater than a second threshold T2. If both the DAR is greater than T1 and ADAT is greater than T2, then operation proceeds from step 505 to step 506, in which the CBSD decreases current SCS, e.g. by a predetermined amount to generate a determined SCS; otherwise, operation proceeds from step 506 to step 508.

In step 508 the CBSD determines if DAR is less than the first threshold T1 and ADAT is less than the second threshold T2. If both the DAR is less than T1 and ADAT is less than T2, then operation proceeds from step 508 to step 510, in which the CBSD increases current SCS, e.g. by a predetermined amount to generate a determined SCS; otherwise, operation proceeds from step 508 to step 512. In step 512 the CBSD leaves the current SCS unchanged. Thus the CBSD determines to leave the current SCS being used by the CBSD to communicate data to one or more wireless devices unchanged in response to determining that: i) at least one of DAT is not greater than T1 and ADAT is not greater than T2 or ii) at least one of: DAR is not less than T1 and ADAT is not less than T2. Operation proceeds from step 512 to step 514 in which the subroutine returns the determined SCS to be used by the CBSD to transmit to one or more wireless devices.

Figure 6:
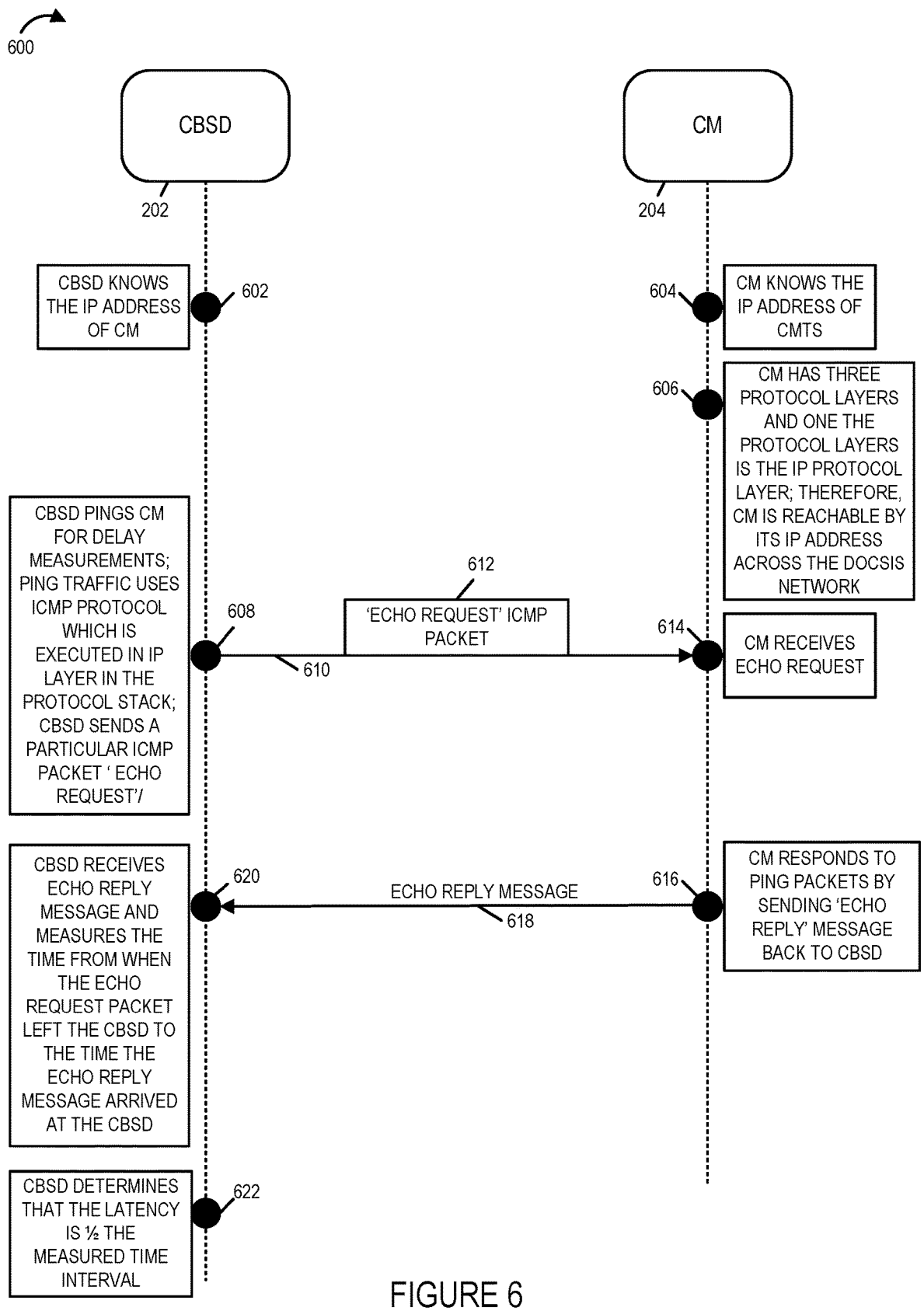
FIG. 6 is a signaling diagram illustrating an exemplary method for determining CM to CBSD latency in accordance with an exemplary embodiment.

FIG. 6 is a signaling diagram 600 illustrating an exemplary method for determining CM to CBSD latency in accordance with an exemplary embodiment. Signaling diagram 600 include exemplary CBSD 202 and exemplary CM 204. Box 602 illustrates that CBSD 202 knows the IP address of CM 204, e.g., as part of system configuration or initialization. Box 604 illustrates that CM 204 knows the IP address of CMTS 606, e.g. as part of system configuration or initialization. Box 606 illustrates that exemplary CM 204 has three protocol layers and one of the protocol layers is the IP protocol layer; therefore CM 204 is reachable by its IP address across the Data Over Cable Service Interface Specification (DOCSIS) network. In step 608 CBSD 202 pings CM 204 for delay measurements. Ping traffic uses Internet control message protocol (ICMP) protocol which is executed in the IP layer in the protocol stack. The CBSD 202 sends a particular ICMP packet 'Echo request'/to the CM 204. Thus, in step 608 CBSD 202 send signals 610 conveying 'Echo request' ICMP packet 612 to CM 204.

In step 614 CM 204 receives the echo request. In step 616, CM 204, responds to the ping packets by sending 'echo reply' message 618 to CBSD 202. In step 620 CBSD 202 receives the echo reply message and measures the time from when the echo request packet 612 left CBSD 202 to the time the echo reply message 618 arrived at the CBSD 202.

In step 622, the CBSD 202 determines the latency between the CM 204 and CBSD 202 is ½ the measured time interval.

Figure 7:
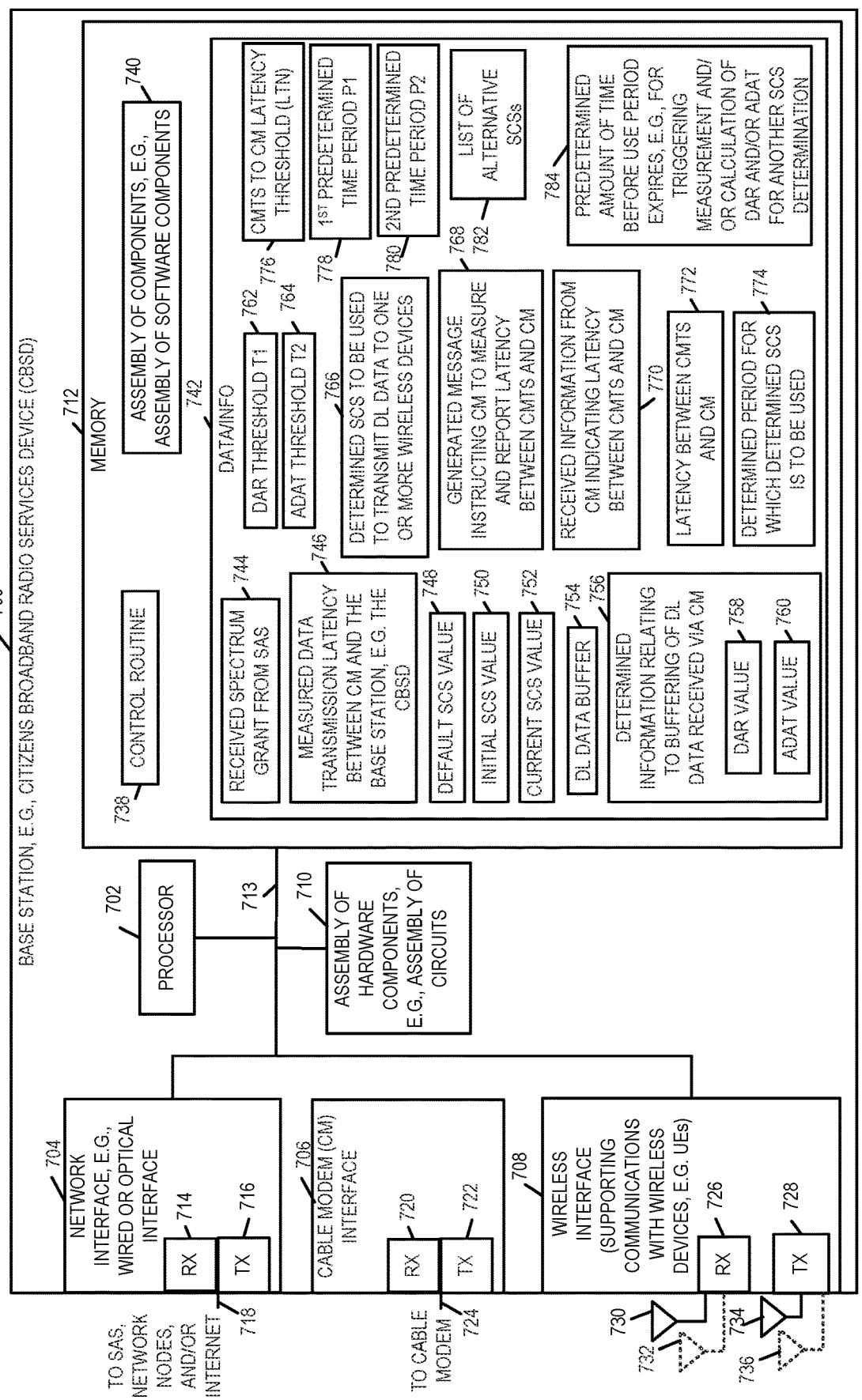
FIG. 7 is a drawing of an exemplary base station, e.g. a Citizens Broadband Radio Services Device (CBSD), in accordance with an exemplary embodiment.

FIG. 7 is a drawing of an exemplary base station 700, e.g. a Citizens Broadband Radio Services Device (CBSD), in accordance with an exemplary embodiment.

Exemplary base station 700 includes a processor 702, e.g. a CPU, a network interface 704, e.g., a wired of optical interface, a cable modem (CM) interface 706, a wireless interface 708, an assembly of hardware components 710, e.g. assembly of circuits, and memory 712, coupled together via a bus 713 over which the various elements may interchange data and information.

Network interface 704 includes a receiver 714 and a transmitter 716. Receiver 714 and transmitter 716 are coupled to connector 718, via which the base station is coupled to a SAS, networks nodes and/or the Internet. Cable modem interface 706 includes a receiver 720 and transmitter 722. Receiver 720 and transmitter 722 are coupled to connector 724, via which the base station 700 is coupled via a cable connection, e.g., a fiber optic or coaxial cable, to a cable modem, e.g., a DOCSIS CM. Wireless interface 708 supports communications with wireless devices, e.g. user equipment (UE) devices. Wireless interface 708 includes a wireless receiver 726 and a wireless transmitter 728. Wireless receiver 726 is coupled to one or more receive antennas (receive antenna 1 730, . . . , receive antenna N 732) via which the base station 700 receives uplink signals from one or more wireless devices. Wireless transmitter 728 is coupled to one or more transmit antennas (transmit antenna 1 734, . . . , transmit antenna N 736) via which the base station 700 transmits downlink signals to one or more wireless devices using a determined subcarrier spacing (SCS) in accordance with an exemplary embodiment. The SCS spacing, used for the wireless downlink, is changed dynamically, e.g. in response to downlink buffer information, e.g. DAR and/or ADAT, and/or CM to base station latency measurements and/or CMTS to CM latency measurements.

Memory 712 includes a control routine 738 for controlling basic operations of the base station, e.g., initialization, CPU control, memory load, memory read, interfaces settings and control, etc., an assembly of components 740, e.g., an assembly of software components, and data/information 742. In some embodiments, the assembly of components 740 includes software modules, routines, and/or applications for performing one of more steps of an exemplary method, e.g., steps of the methods of flowcharts 400 of FIG. 4 and/or flowchart 500 of FIG. 5, which are performed by a base station, e.g. a CBSD.

Data information 742 includes a received spectrum grant 744 from a SAS, measured data transmission latency 746 between CM and the base station, e.g. the CBSD, a default SCS value 748, an initial SCS value 750, a current SCS value 752, a downlink data buffer 754, and determined information 756 relating to buffering DL data received via the CM. The determined information 756 relating to buffering DL data received via the CM includes a measured or calculated DAR value 758 and a measured or calculated ADAT value 760. Data/information 742 further includes a DAR threshold, Threshold 1 (T1) 762, an ADAT threshold, Threshold (T2) 764, and a determined SCS 766 to be used to transmit DL data to one or more wireless devices. Data/information 700 further includes a generated message 768 instructing the CM to measure and report latency between CMTS and CM, received information 770 from the CM indicating latency between CMTS and CM, and determined latency 772 between CMTS and CM derived from the received information 770. Data/information 742 further includes a determined period 774 for which the determined SCS is to be used, a CMTS to CM latency threshold value LTN 766, a 1st predetermined time period P1 778, a second predetermined time period P2 780, a list of alternative SCSs 782 which may be used for DL transmissions to wireless devices (e.g., 15 kHz, 30 kHz, 60 kHz, 120 kHz and 240 kHz), and a predetermined amount of time 784 before SCS use period expires, e.g., for triggering measurement and/or calculation of DAR and/or ADAT for another SCS determination.

Figures 8, 8B:
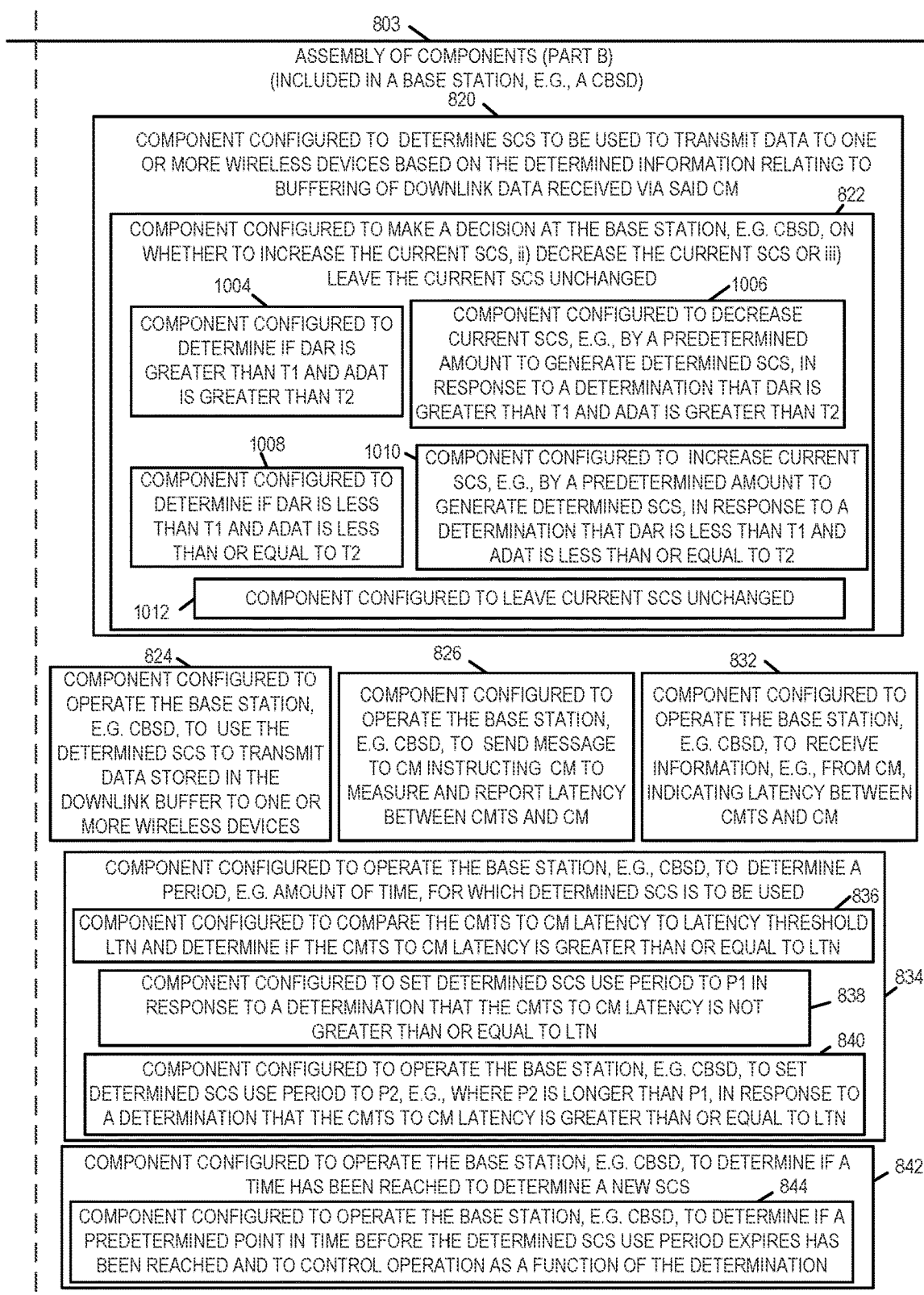
FIG. 8B is a drawing of a second part of an exemplary assembly of components, which may be included in a base station, e.g. a CBSD, in accordance with an exemplary embodiment.
FIG. 8 comprises the combination of FIG. 8A and FIG. 8B.
Figure 8A:
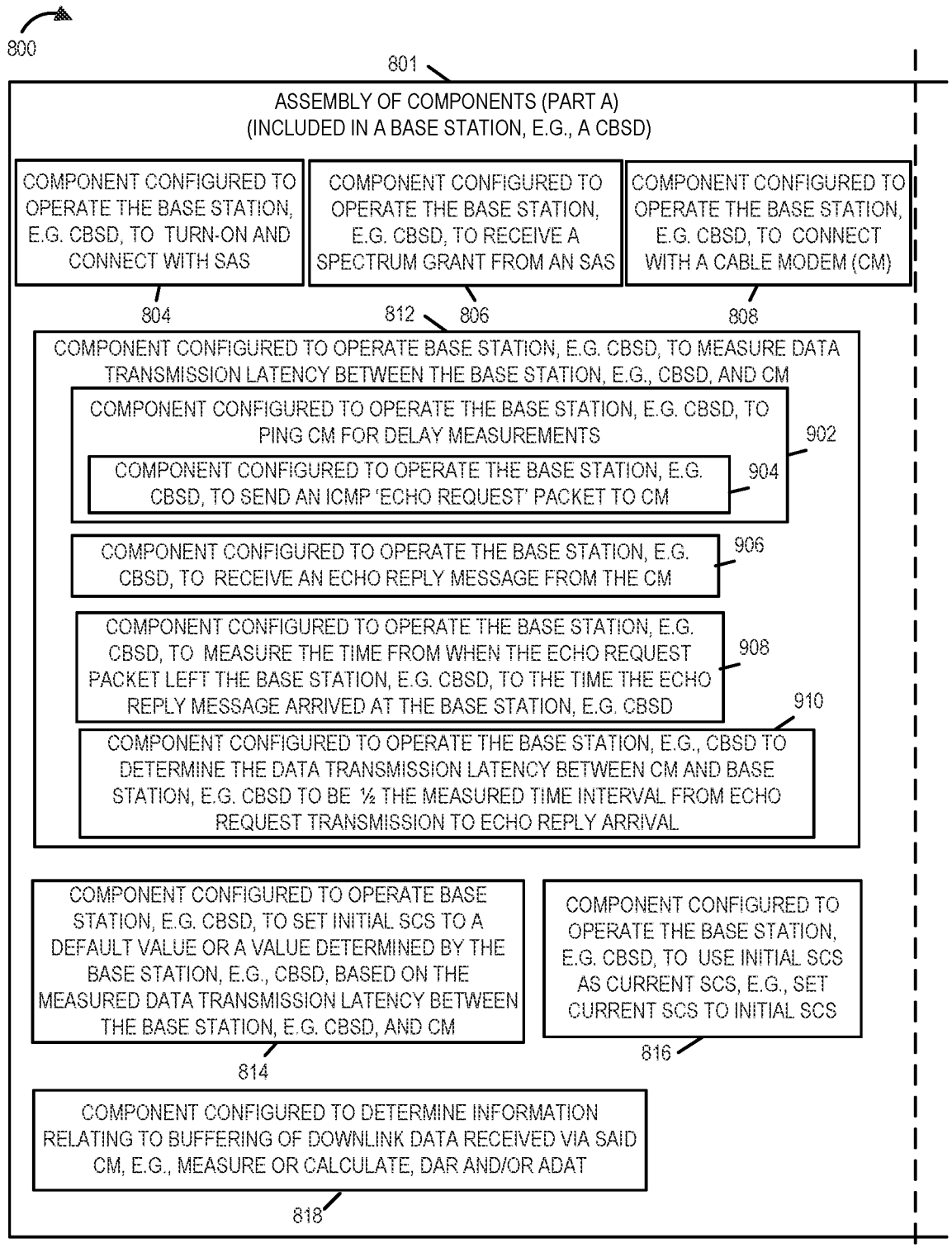
FIG. 8A is a drawing of a first part of an exemplary assembly of components, which may be included in a base station, e.g. a CBSD, in accordance with an exemplary embodiment.

FIG. 8, comprising the combination of FIG. 8A and FIG. 8B, is drawing of an exemplary assembly of components 800, comprising Part A 801 and Part B 803, which may be included in an exemplary base station, e.g. a CBSD, in accordance with an exemplary embodiment. In some embodiments the base station including the assembly of components 800 is, e.g., CBSD 1 202 of FIG. 1, FIG. 2, FIG. 3 and FIG. 6, CBSD M 252 of FIG. 1, a CBSD implementing the method of flowchart 400 of FIG. 4, a CBSD implementing the method of flowchart 500 of FIG. 5, and/or base station 700.

The components in the assembly of components 800 can, and in some embodiments are, implemented fully in hardware within a processor, e.g., processor 702, e.g., as individual circuits. The components in the assembly of components 800 can, and in some embodiments are, implemented fully in hardware within the assembly of hardware components 710, e.g., as individual circuits corresponding to the different components. In other embodiments some of the components are implemented, e.g., as circuits, within processor 702 with other components being implemented, e.g., as circuits within assembly of components 710, external to and coupled to the processor 702. As should be appreciated the level of integration of components on the processor and/or with some components being external to the processor may be one of design choice. Alternatively, rather than being implemented as circuits, all or some of the components may be implemented in software and stored in the memory 712 of the base station 700, with the components controlling operation of base station 700 to implement the functions corresponding to the components when the components are executed by a processor e.g., processor 702. In some such embodiments, the assembly of components 800 is included in the memory 712 as part of an assembly of software components 740. In still other embodiments, various components in assembly of components 800 are implemented as a combination of hardware and software, e.g., with another circuit external to the processor providing input to the processor which then under software control operates to perform a portion of a component's function.

When implemented in software the components include code, which when executed by a processor, e.g., processor 702, configure the processor to implement the function corresponding to the component. In embodiments where the assembly of components 800 is stored in the memory 712, the memory 712 is a computer program product comprising a computer readable medium comprising code, e.g., individual code for each component, for causing at least one computer, e.g., processor 702, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the base station 700 or elements therein such as the processor 702, to perform the functions of corresponding steps illustrated and/or described in the method of one or more of the flowcharts, signaling diagrams and/or described with respect to any of the Figures. Thus, the assembly of components 800 includes various components that perform functions of corresponding one or more described and/or illustrated steps of an exemplary method, e.g., steps of the method of flowchart 400 of FIG. 4, steps of the method of flowchart 500 of FIG. 5 and/or steps of the method of signaling diagram 600 of FIG. 6.

Assembly of components 800 includes a component 804 configured to operate the base station, e.g. CBSD, to turn-on and connect with an SAS, a component 806 configured to operate the base station, e.g. CBSD, to receive a spectrum grant from an SAS, and a component 808 configured to operate the base station, e.g. CBSD, to connect with a cable modem (CM). Assembly of components 800 further includes a component 812 configured to operate the base station, e.g. CBSD, to measure data transmission latency between the base station, e.g. CBSD, and CM. Component 812 includes a component 902 configured to operate the base station, e.g. CBSD, to ping the CM for delay measurements. Component 902 includes a component 904 configured to operate the base station, e.g. CBSD, to send and ICMP 'Echo Request' packet to the CM. Component 812 further includes a component 906 configured to operate the base station, e.g. CBSD, to receive an echo reply message from the CM, a component 908 configured to operate the base station, e.g. CBSD, to measure the time from which the echo request packet left the base station, e.g. CBSD, to the time the echo reply message arrived at the base station, e.g. CBSD, and a component 910 configured to determine the data transmission latency between CM and base station, e.g. CBSD, to be ½ the measured time interval from echo request transmission to echo reply arrival.

Assembly of components 800 further includes a component 814 configured to operate the base station, e.g. CBSD, to set initial SubCarrier Spacing (SCS) to a default value or a value determined by the base station, e.g. CBSD, based on the measured data transmission latency between the base station, e.g. CBSD and the CM, a component 816 configured to operate the base station, e.g. CBSD, to use initial SCS as current SCS, e.g., set current SCS to initial SCS, an a component 818 configured to determine information relating to buffering of downlink data receive via said CM, e.g. measure or calculate Downlink Arrival Rate (DAR) and/or Average Data Arrival Time (ADAT).

Assembly of components 800 further includes a component 820 configured to determine SCS to be used to transmit data to one or more wireless devices, e.g. UEs, based on the determine information relating to buffering of downlink data received via CM. Component 820 includes a component 1004 configured to determine if: i) DAR is greater than T1 and ii) ADAT is greater than T2, a component 1006 configured to decrease current SCS, e.g. by a predetermined amount to generate determined SCS, in response to a determination that DAR is greater than T1 and ADAT is greater than T2, a component 1008 configured to determine if: i) DAR is less than T1 and ADAT is less than or equal to T2, a component 1010 configured to increase currents SCS, e.g., by a predetermined amount to generate determined SCS, in response to a determination that DAR is less than T1 and ADAT is less than or equal to T2, and a component 1012 configured to leave the current SCS unchanged, e.g., in response to determination that, i) DAR is not greater than T1 and/or ADAT is not greater than T2, and ii) DAR is greater than or equal to T1 and/or ADAT is greater than T2.

Assembly of components 800 further includes a component 824 configured to operate the base station, e.g. CBSD, to used the determined SCS to transmit data stored in the downlink buffer to one or more wireless terminals, a component 826 configured to operate the base station, e.g. CBSD, to send a message to CM instructing the CM to measure and report latency between CMTS and CM, and a component 832 configured to operate the base station, e.g. CBSD, to receive information, e.g. from CM, indicating latency between CMTS and CM.

Assembly of components 800 further includes a component 834 configured to operate the base station, e.g. CBSD, to determine a period, e.g. an amount of time, for which the determined SCS is to be used. Component 834 includes a component 836 configured to compare the CMTS to CM latency to a latency threshold (LTN) and determine if the CMTS to CM latency is greater than or equal to the threshold LTN, a component 838 configured to set determined SCS use period to P1 in response to a determination that the CMTS to CM latency is not greater than or equal to LTN, and a component 840 configured to operate the base station, e.g. CBSD, to set determined SCS use period to P2, e.g. where P2 is longer than P1, in response to a determination that the CMTS to CM latency is greater than or equal to LTN. Assembly of components 800 further includes a component 842 configured to operate the base station, e.g., CBSD, to determine if a time has been reached to determine a new SCS. Component 842 includes a component 844 configured to operate the base station, e.g. CBSD, to determine if a predetermined point in time before the determined SCS use period expires has been reached and to control operation as a function of the determination.

Numbered List of Exemplary Method Embodiments

Method Embodiment 1. A method of operating a base station (e.g., a CBSD) connected to a modem (e.g., DOCSIS cable modem) by a cable (e.g., co-axial or fiberoptic cable), the method comprising: determining (418) information relating to buffering of downlink data supplied by said cable, said information including one or both of: i) a data accumulation rate (DAR) of a downlink buffer used to store downlink data supplied by said cable (e.g., base station downlink buffer used to store downlink data received via the cable modem) and ii) an average data arrival time (ADAT) of the downlink buffer; determining (420), at the base station, a subcarrier spacing (SCS) to be used by the base station to transmit data to one or more wireless devices based on the determined (416) information relating to buffering of downlink data supplied by said cable; and using (424) the determined SCS to transmit data stored in the downlink buffer to one or more wireless devices.

Method Embodiment 2. The method of Method Embodiment 1 further comprising: wherein determining (420), at the base station, the subcarrier spacing (SCS) to be used by the base station to transmit data to one or more wireless devices includes making a decision (422) whether to i) increase a current SCS, ii) decrease the current SCS or iii) leave the current SCS unchanged.

Method Embodiment 3. The method of Method Embodiment 2, further comprising: using an initial SCS (416) as the current SCS the first time said step of determining (420), at the base station, a symbol carrier spacing (SCS) to be used by the base station to transmit data to one or more wireless device based on the determined information relating to buffering of downlink data supplied by said cable, said initial SCS being a default SCS or an SCS based on a measured transmission latency (e.g., delay).

Method Embodiment 4. The method of Method Embodiment 2, further comprising: measuring (412) data transmission latency between the modem and base station; and selecting (414) the initial SCS based on the measured data transmission latency between the modem and base station.

Method Embodiment 5. The method of Method Embodiment 2, wherein determining (420), at the base station, subcarrier spacing (SCS) to be used by the base station to transmit data to one or more wireless devices includes: determining (422), based on one or both of the DAR and ADAT whether to i) increase the current SCS used to communicate data to one or more wireless terminals, ii) decrease the current SCS used to communicate data to one or more wireless terminals or iii) leave the current SCS being used to communicate data to one or more wireless terminals unchanged. See FIG. 5 which is a subroutine which can be called to implement step 420 and which will have logic for increase, decrease or leave current SCS unchanged. FIG. 5 supports method embodiments 6, 7, and 8.

Method Embodiment 6. The method of Method Embodiment 5, wherein determining (420), at the base station, subcarrier spacing (SCS) to be used by the base station to transmit data to one or more wireless devices includes: determining (510) to i) increase the current SCS used to communicate data to one or more wireless terminals in response to determining that the DAR is less than the first threshold (T1) and that the ADAT is below the second threshold (T2).

Method Embodiment 7. The method of Method Embodiment 5, wherein determining (420), at the base station, subcarrier spacing (SCS) to be used by the base station to transmit data to one or more wireless devices includes: determining (506) to ii) decrease the current SCS used to communicate data to one or more wireless terminals in response to determining that both the DAR is greater than a first threshold (T1) and the ADAT is greater than a second threshold (T2).

Method Embodiment 8. The method of Method Embodiment 5, wherein determining (420), at the base station, subcarrier spacing (SCS) to be used by the base station to transmit data to one or more wireless devices includes: determining (512) to iii) leave the current SCS being used to communicate data to one or more wireless terminals unchanged in response to determining that i) at least one of: the DAR is not greater than T1 and the ADAT is not greater than T2 and also that ii) at least one of: the DAR is not less than T1 and the ADAT is not less than T2.

Method Embodiment 9. The method of Method Embodiment 2, further comprising: sending (428), from the base station, a message to the modem to trigger measurement of a latency between a modem termination system (e.g., CMTS) and the modem (e.g., CM); and receiving (432), at the base station, from the modem, information indicating the measured latency modem termination system (e.g., CMTS) to modem (e.g., CM) latency.

Method Embodiment 10. The method of Method Embodiment 9, further comprising: determining (434) based on the cable modem termination system (e.g., CMTS) to modem (e.g., CM) latency a period for which the determined SCS is to be used.

Method Embodiment 11 The method of Method Embodiment 10, wherein said period is determined to be a first period having a first duration when the CMTS to CM latency is below a latency threshold (LTN) and said period is determined to be a second period having a second duration when the CMTS to CM latency is not below (e.g., is equal to or greater than) the latency threshold (LTN).

Method Embodiment 11A. The method of Method Embodiment 11, wherein said second period is multiple minutes in duration.

Method Embodiment 11B. The method of Method Embodiment 11A wherein said first period is less than two minutes in duration.

Method Embodiment 12. The method of Method Embodiment 10, further comprising: determining (442) at the base station (e.g., CBSD) if a time has been reached to determine a new SCS; and in response to determining (442) at the base station (e.g., CBSD) that the time has been reached to determine a new SCS, repeating (represented by arrow 445) said steps of: i) determining (418) information relating to buffering of downlink data supplied by said cable, said information including one or both of: i) a data accumulation rate (DAR) of a downlink buffer used to store downlink data supplied by said cable (e.g., base station downlink buffer used to store downlink data received via the cable modem) and ii) an average data arrival time (ADAT) of the downlink buffer; and ii) determining (420), at the base station, a subcarrier spacing (SCS) to be used by the base station to transmit data to one or more wireless device based on the determined (418) information relating to buffering of downlink data supplied by said cable.

Method Embodiment 13. The method of Method Embodiment 12, wherein determining (442) at the base station (e.g., CBSD) if a time has been reached to determine a new SCS includes determining (444) if a predetermined point in time before (e.g., 30 seconds before, allowing for sufficient time for the determination steps to be performed before the new SCS is to be used) the determined SCS use time period expires has been reached.

Numbered List of Exemplary Apparatus Embodiments

Apparatus Embodiment 1. A base station (e.g., a CBSD) (202 or 700) connected to a modem (e.g., DOCSIS cable modem) (204) by a cable (e.g., co-axial or fiberoptic cable) (214), the base station (202 or 700) comprising: a processor (702) configured to: determine (418) information relating to buffering of downlink data supplied by said cable, said information including one or both of: i) a data accumulation rate (DAR) of a downlink buffer used to store downlink data supplied by said cable (e.g., base station downlink buffer used to store downlink data received via the cable modem) and ii) an average data arrival time (ADAT) of the downlink buffer; determine (420), at the base station, a subcarrier spacing (SCS) to be used by the base station to transmit data to one or more wireless devices based on the determined (416) information relating to buffering of downlink data supplied by said cable; and operate the base station to use (424) the determined SCS to transmit data stored in the downlink buffer to one or more wireless devices (208, 210).

Apparatus Embodiment 2. The base station (202 or 700) of Apparatus Embodiment 1, wherein said processor (702) is configured to: make a decision (422) whether to: i) increase a current SCS, ii) decrease the current SCS or iii) leave the current SCS unchanged, as part of being configured to determine (420) the subcarrier spacing (SCS) to be used by the base station to transmit data to one or more wireless devices.

Apparatus Embodiment 3. The base station (202 or 700) of Apparatus Embodiment 2, wherein said processor (702) is further configured to: use an initial SCS (416) as the current SCS the first time said step of determining (420), at the base station, a symbol carrier spacing (SCS) to be used by the base station to transmit data to one or more wireless device based on the determined information relating to buffering of downlink data supplied by said cable, said initial SCS being a default SCS or an SCS based on a measured transmission latency (e.g., delay).

Apparatus Embodiment 4. The base station (202 or 700) of Apparatus Embodiment 2, wherein said processor (702) is further configured to: measure (412) data transmission latency between the modem (204) and base station (202 or 700); and select (414) the initial SCS based on the measured data transmission latency between the modem and base station.

Apparatus Embodiment 5. The base station (202 or 700) of Apparatus Embodiment 2, wherein said processor (702) is configured to: determine (422), based on one or both of the DAR and ADAT whether to i) increase the current SCS used to communicate data to one or more wireless terminals, ii) decrease the current SCS used to communicate data to one or more wireless terminals or iii) leave the current SCS being used to communicate data to one or more wireless terminals unchanged, as part of being configured to determine (420), at the base station, subcarrier spacing (SCS) to be used by the base station to transmit data to one or more wireless devices.

FIG. 5 which is a subroutine which can be called to implement step 420 and which will have logic for increase, decrease or leave current SCS unchanged when implemented in a device, supports apparatus embodiments 6, 7, and 8.

Apparatus Embodiment 6. The base station (202 or 700) of Apparatus Embodiment 5, wherein said processor (702) is configured to: determine (510) to i) increase the current SCS used to communicate data to one or more wireless terminals in response to determining that the DAR is less than the first threshold (T1) and that the ADAT is below the second threshold (T2), as part of being configured to determine (420), at the base station, subcarrier spacing (SCS) to be used by the base station to transmit data to one or more wireless devices.

Apparatus Embodiment 7. The base station (202 or 700) of Apparatus Embodiment 5, wherein said processor (702) is configured to: determine (506) to ii) decrease the current SCS used to communicate data to one or more wireless terminals in response to determining that both the DAR is greater than a first threshold (T1) and the ADAT is greater than a second threshold (T2), as part of being configured to determine (420), at the base station, subcarrier spacing (SCS) to be used by the base station to transmit data to one or more wireless devices.

Apparatus Embodiment 8. The base station (202 or 700) of Apparatus Embodiment 5, wherein said processor (702) is configured to: determine (512) to iii) leave the current SCS being used to communicate data to one or more wireless terminals unchanged in response to determining that i) at least one of: the DAR is not greater than T1 and the ADAT is not greater than T2 and also that ii) at least one of: the DAR is not less than T1 and the ADAT is not less than T2, as part of being configured to determine (420), at the base station, subcarrier spacing (SCS) to be used by the base station to transmit data to one or more wireless devices.

Apparatus Embodiment 9. The base station (202 or 700) of Apparatus Embodiment 2, further comprising: a cable modem interface (706) including a transmitter (722) and a receiver (720); and wherein said processor (702) is further configured to: operate the base station to send (428), from the base station, (via the cable modem transmitter) a message to the modem to trigger measurement of a latency between a modem termination system (e.g., CMTS) (206) and the modem (e.g., CM) (204); and operate the base station to receive (432), at the base station (via the cable modem receiver), from the modem, information indicating the measured latency modem termination system (e.g., CMTS) to modem (e.g., CM) latency.

Apparatus Embodiment 10. The base station (202 or 700) of Apparatus Embodiment 9, wherein said processor (702) is further configured to: determine (434) based on the cable modem termination system (e.g., CMTS) to modem (e.g., CM) latency a period for which the determined SCS is to be used.

Apparatus Embodiment 11. The base station (202 or 700) of Apparatus Embodiment 10, wherein said period is determined to be a first period having a first duration when the CMTS to CM latency is below a latency threshold (LTN) and said period is determined to be a second period having a second duration when the CMTS to CM latency is not below (e.g., is equal to or greater than) the latency threshold (LTN). Apparatus Embodiment 11A. The base station (202 or 700) of Apparatus Embodiment 11, wherein said second period is multiple minutes in duration.

Apparatus Embodiment 11B. The base station (202 or 700) of Apparatus Embodiment 11A wherein said first period is less than two minutes in duration.

Apparatus Embodiment 12. The base station (202 or 700) of Apparatus Embodiment 10, wherein said processor (702) is configured to: determine (442) at the base station (e.g., CBSD) if a time has been reached to determine a new SCS; and in response to determining (442) at the base station (e.g., CBSD) that the time has been reached to determine a new SCS, repeating (represented by arrow 445) said steps of: i) determining (418) information relating to buffering of downlink data supplied by said cable, said information including one or both of: i) a data accumulation rate (DAR) of a downlink buffer used to store downlink data supplied by said cable (e.g., base station downlink buffer used to store downlink data received via the cable modem) and ii) an average data arrival time (ADAT) of the downlink buffer; and ii) determining (420), at the base station, a subcarrier spacing (SCS) to be used by the base station to transmit data to one or more wireless device based on the determined (418) information relating to buffering of downlink data supplied by said cable.

Apparatus Embodiment 13. The base station (202 or 700) of Apparatus Embodiment 12, wherein said processor (702) is configured to: determine (444) if a predetermined point in time before (e.g., 30 seconds before, allowing for sufficient time for the determination steps to be performed before the new SCS is to be used) the determined SCS use time period expires has been reached, as part of being configured to determine (442) at the base station (e.g., CBSD) if a time has been reached to determine a new SCS.

Numbered List of Exemplary Non-Transitory Computer Readable Medium Embodiments

Non-Transitory Computer Readable Medium Embodiment 1. A non-transitory computer readable medium (712) including computer executable instructions which when executed by a processor (702) of a base station (e.g., a CBSD) (202 or 700) connected to a modem (e.g., DOCSIS cable modem) (204) by a cable (e.g., co-axial or fiberoptic cable) (214) cause the base station (202 or 700) to perform the steps of: determining (418) information relating to buffering of downlink data supplied by said cable, said information including one or both of: i) a data accumulation rate (DAR) of a downlink buffer used to store downlink data supplied by said cable (e.g., base station downlink buffer used to store downlink data received via the cable modem) and ii) an average data arrival time (ADAT) of the downlink buffer; determining (420), at the base station, a subcarrier spacing (SCS) to be used by the base station to transmit data to one or more wireless devices based on the determined (416) information relating to buffering of downlink data supplied by said cable; and using (424) the determined SCS to transmit data stored in the downlink buffer to one or more wireless devices.

Various aspects and/or features of some embodiments of the present invention are described below.

In 5G wireless systems subcarrier spacing (SCS) is used to control 5G data transmission latency. In 5G, OFDM symbol duration is increased or decreased by changing the subcarrier spacing (SCS). The higher the SCS, the lower the data transmission latency tends to be in the 5G network. There are SCS 15, 30, 60, and 120 KHz levels defined in the 5G wireless standard.

In an exemplary strand based deployment model, CBSD backhaul is provided over DOCSIS, and DOCSIS latency is traffic load dependent. That is, when the traffic load increases in DOCSIS network, the DOCSIS latency also increases. DOCSIS network consists of cable modems (CMs) and Cable Modem Termination Systems (CMTSs). CBSD is connected to CM over cable, and CM is connected to CMTS over cable. DL buffer on CBSD collects the data packets coming from CM.

Even though 5G CBSD might deliver data with low latency, the data might not arrive at the downlink buffer of CBSD with the same latency, and hence, SCS configuration might not serve the purpose of SCS. With a high SCS value, a scheduler (e.g. in a CBSD) schedules the data more frequently, and this causes additional processing power leading to more power consumption. High power consumption is not desirable especially for strand based CBSDs.

An exemplary method in accordance with some embodiments of the present invention includes SCS adjustment based on DOCSIS latency.

Exemplary steps and/or features of an exemplary method, in accordance with some embodiments of the present invention, are described below.

1—CBSD turns on and connects with SAS.
2—SAS grants spectrum to CBSD.
3—CBSD is connected to DOCSIS network for backhaul connection. DOCSIS network consists of cable modem and cable modem termination systems. CBSD is connected to CM.
4—When the traffic load in the DOCSIS network increases, the data transmission latency from CMTS to CM increases.
5—Increasing data transmission latency will slow down the packet accumulation rate in DL buffer.
6—CBSD measures the data accumulation rate (DAR) and average data arrival time (ADAT) in DL buffer.
7—When DAR and ADAT goes above a threshold, CBSD lowers the SCS. Similarly, when DAR and ADAT goes below a threshold, CBSD increases SCS. DAR and ADAT are measured in a time interval which is long enough to assess the stable DAT and ADAT values.
8—CBSD sends a message to CM to measure its own data transmission latency between CM and CMTS. CM will send this measured latency information to CBSD. The CBSD will use this information to determine the duration for a selected SCS value. If data transmission latency is high, then selected SCS value will be kept for a time longer than 'N', and if it is low, then SCS value will be kept for a time shorter than 'N'.

Various embodiments are directed to apparatus, e.g., base stations, e.g. CBSDs, cable modems (CMs), cable modem termination systems (CMTS), base stations supporting massive MIMO such as CBSDs supporting massive MIMO, network management nodes, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, etc., other network communications devices such as routers, switches, etc., mobile network operator (MNO) base stations (macro cell base stations and small cell base stations) such as a Evolved Node B (eNB), gNB or ng-eNB, mobile virtual network operator (MVNO) base stations such as Citizens Broadband Radio Service Devices (CBSDs), network nodes, MNO and MVNO HSS devices, relay devices, e.g. mobility management entities (MMEs), a Spectrum Access System (SAS), an AFC system, an Access and Mobility Management Function (AMF) device, servers, customer premises equipment devices, cable systems, network nodes, gateways, cable headend and/or hubsites, network monitoring nodes and/or servers, cluster controllers, cloud nodes, production nodes, cloud services servers and/or network equipment devices. Various embodiments are also directed to methods, e.g., method of controlling and/or operating a base station, e.g. a CBSD, a cable modems (CM), a cable modem termination system (CMTS), a base station supporting massive MIMO such as a CBSD supporting massive MIMO, a network management node, access points (APs), e.g., WiFi APs, base stations such as NRU gNB base stations, etc., user devices such as stations (STAs), e.g., WiFi STAs, user equipment (UE) devices, LTE LAA devices, various types of RLAN devices, network communications devices such as routers, switches, etc., user devices, base stations, e.g., eNB and CBSDs, gateways, servers (HSS server), MMEs, SAS, an AFC system, cable networks, cloud networks, nodes, servers, cloud service servers, customer premises equipment devices, controllers, network monitoring nodes and/or servers and/or cable or network equipment devices. Various embodiments are directed to communications network which are partners, e.g., a MVNO network and a MNO network. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements are steps are implemented using hardware circuitry.

In various embodiments nodes and/or elements described herein are implemented using one or more components to perform the steps corresponding to one or more methods, for example, message reception, message generation, signal generation, signal processing, sending, comparing, determining and/or transmission steps. Thus, in some embodiments various features are implemented using components or in some embodiment's logic such as for example logic circuits. Such components may be implemented using software, hardware or a combination of software and hardware.

While the invention has been described in the context of a cable delivery system which uses a DOCSIS modem and coaxial cable in some embodiments, the methods and apparatus can be used in the context of other cable and modem combinations. In fact, the methods and apparatus can be used with a fiber optic cable and optical modem and/or with other types of cables and modems. Thus, it should be appreciated that a base station can use the described methods with a wide range of cable and modem combinations.

Many of the above-described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a base station, e.g. CBSD, a cable modems (CM), a cable modem termination system (CMTS), a base station supporting massive MIMO such as a CBSD supporting massive MIMO, a network management device, an access points (AP), e.g., WiFi AP, base stations such as NRU gNB base station, etc., a user device such as a station (STA), e.g., WiFi STA, a user equipment (UE) device, LTE LAA device, etc., an RLAN device, other network communications devices a network communications device such as a router, switch, etc., a MVNO base station such as a CBRS base station, e.g., a CBSD, a device such as a cellular base station e.g., an eNB, a MNO HSS server, a MVNO HSS server, a UE device, a relay device, e.g. a MME, SAS, a AFC system, etc., said device including a processor configured to implement one, multiple or all of the steps of one or more methods of the invention.

In some embodiments, the processor or processors, e.g., CPUs, of one or more devices, e.g., a base station, e.g. a CBSD, a cable modems (CM), cable modem termination system (CMTS), a base station supporting massive MIMO such as a CBSD supporting massive MIMO, a network management device, communications nodes such as e.g., access points (APs), e.g., WiFi APs, base stations such as NRU gNB base stations, etc., user devices such as stations (STAs), e.g., WiFi STAs, user equipment (UE) devices, LTE LAA devices, etc., various RLAN devices, network communications devices such as routers, switches, etc., a MVNO base station such as a CBRS base station, e.g. a CBSD, an device such as a cellular base station e.g., an eNB, a MNO HSS server, a MVNO HSS device server, a UE device, a relay device, e.g. a MME, a SAS, a AFC system, are configured to perform the steps of the methods described as being performed by the communications nodes, e.g., controllers. The configuration of the processor may be achieved by using one or more components, e.g., software components, to control processor configuration and/or by including hardware in the processor, e.g., hardware components, to perform the recited steps and/or control processor configuration.

Accordingly, some but not all embodiments are directed to a device, e.g., a base station, e.g. a CBSD, a cable modem (CM), a cable modem termination system (CMTS), a base station supporting massive MIMO such as a CBSD supporting massive MIMO, a network management device, an access points (AP), e.g., WiFi AP, a base station such as NRU gNB base station, etc., a user device such as station (STA), e.g., WiFi STA, a user equipment (UE) device, an LTE LAA device, etc., a RLAN device, a network communications device such as router, switch, etc., administrator device, security device, a MVNO base station such as a CBRS base station, e.g. a CBSD, an device such as a cellular base station e.g., an eNB, a MNO HSS server, a MVNO HSS device server, a UE device, a relay device, e.g. a MME, includes a component corresponding to each of one or more of the steps of the various described methods performed by the device in which the processor is included. In some but not all embodiments a device, e.g., a communications node such as e.g., e.g., a base station, e.g. CBSD, a cable modem (CM), a cable modem termination systems (CMT), a base station supporting massive MIMO such as a CBSD supporting massive MIMO, a network management device, an access points (AP), e.g., WiFi AP, a base station such as NRU gNB base station, etc., a user device such as a station (STA), e.g., WiFi STA, a user equipment (UE) device, a LTE LAA device, a RLAN device, a router, switch, etc., administrator device, security device, a AFC system, a MVNO base station such as a CBRS base station, e.g., a CBSD, a device such as a cellular base station e.g., an eNB, an MNO HSS server, a MVNO HSS device server, a UE device, a relay device, e.g. a MME, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above.

Depending on the embodiment, the computer program product can, and sometimes does, include different code for each step to be performed. Thus, the computer program product may, and sometimes does, include code for each individual step of a method, e.g., a method of controlling a controller or node. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a base station, e.g. CBSD, a cable modem (CM), a cable modem termination system (CMTS), a base station supporting massive MIMO such as a CBSD supporting massive MIMO, a network management node or device, a communications device such as a communications nodes such as e.g., an access point (AP), e.g., WiFi AP, a base station such as NRU gNB base station, etc., a user device such as a station (STA), e.g., WiFi STA, a user equipment (UE) device, a LTE LAA device, etc., an RLAN device, a network communications device such as router, switch, etc., administrator device, security device, a AFC system, MNVO base station, e.g., a CBSD, an MNO cellular base station, e.g., an eNB or a gNB, a HSS server, a UE device, a SAS or other device described in the present application. In some embodiments, components are implemented as hardware devices in such embodiments the components are hardware components. In other embodiments components may be implemented as software, e.g., a set of processor or computer executable instructions. Depending on the embodiment the components may be all hardware components, all software components, a combination of hardware and/or software or in some embodiments some components are hardware components while other components are software components.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A method of operating a base station connected to a modem by a cable, the method comprising:
   determining information relating to buffering of downlink data supplied by said cable, said information including one or both of: i) a data accumulation rate (DAR) of a downlink buffer used to store downlink data supplied by said cable and ii) an average data arrival time (ADAT) of the downlink buffer;
   determining, at the base station, a subcarrier spacing (SCS) to be used by the base station to transmit data to one or more wireless devices based on the determined information relating to buffering of downlink data supplied by said cable; and
   using the determined SCS to transmit data stored in the downlink buffer to one or more wireless devices.

2. The method of claim 1 further comprising:
   wherein determining, at the base station, the SCS to be used by the base station to transmit data to one or more wireless devices includes making a decision whether to i) increase a current SCS, ii) decrease the current SCS or iii) leave the current SCS unchanged.

3. The method of claim 2, further comprising:
   using an initial SCS as the current SCS the first time said step of determining, at the base station, a SCS to be used by the base station to transmit data to one or more wireless device based on the determined information relating to buffering of downlink data supplied by said cable, said initial SCS being a default SCS or an SCS based on a measured transmission latency.

4. The method of claim 2, further comprising:
   measuring data transmission latency between the modem and base station; and
   selecting the initial SCS based on the measured data transmission latency between the modem and base station.

5. The method of claim 2, wherein determining, at the base station, SCS to be used by the base station to transmit data to one or more wireless devices includes:
   determining, based on one or both of the DAR and ADAT whether to i) increase the current SCS used to communicate data to one or more wireless terminals, ii) decrease the current SCS used to communicate data to one or more wireless terminals or iii) leave the current SCS being used to communicate data to one or more wireless terminals unchanged.

6. The method of claim 5, wherein determining, at the base station, SCS to be used by the base station to transmit data to one or more wireless devices includes:
   determining to i) increase the current SCS used to communicate data to one or more wireless terminals in response to determining that the DAR is less than the first threshold (T1) and that the ADAT is below the second threshold (T2).

7. The method of claim 5, wherein determining, at the base station, SCS to be used by the base station to transmit data to one or more wireless devices includes:
   determining to ii) decrease the current SCS used to communicate data to one or more wireless terminals in response to determining that both the DAR is greater than a first threshold (T1) and the ADAT is greater than a second threshold (T2).

8. The method of claim 5, wherein determining, at the base station, SCS to be used by the base station to transmit data to one or more wireless devices includes:
   determining to iii) leave the current SCS being used to communicate data to one or more wireless terminals unchanged in response to determining that i) at least one of: the DAR is not greater than T1 and the ADAT is not greater than T2 and also that ii) at least one of: the DAR is not less than T1 and the ADAT is not less than T2.

9. The method of claim 2, further comprising:
   sending, from the base station, a message to the modem to trigger measurement of a latency between a modem termination system and the modem; and
   receiving, at the base station, from the modem, information indicating the measured latency modem termination system to modem latency.

10. The method of claim 9, further comprising:
    determining based on the cable modem termination system (CMTS) to cable modem (CM) latency a period for which the determined SCS is to be used.

11. The method of claim 10, wherein said period is determined to be a first period having a first duration when the CMTS to CM latency is below a latency threshold (LTN) and said period is determined to be a second period having a second duration when the CMTS to CM latency is not below the latency threshold (LTN).

12. The method of claim 10, further comprising:
    determining at the base station if a time has been reached to determine a new SCS; and
    in response to determining at the base station that the time has been reached to determine a new SCS, repeating said steps of:
    i) determining information relating to buffering of downlink data supplied by said cable, said information including one or both of: i) a data accumulation rate (DAR) of a downlink buffer used to store downlink data supplied by said cable and ii) an average data arrival time (ADAT) of the downlink buffer; and ii) determining, at the base station, a SCS to be used by the base station to transmit data to one or more wireless device based on the determined information relating to buffering of downlink data supplied by said cable.

13. The method of claim 12, wherein determining at the base station if a time has been reached to determine a new SCS includes determining if a predetermined point in time before the determined SCS use time period expires has been reached.

14. A base station connected to a modem by a cable, the base station comprising:
a processor configured to:
  determine information relating to buffering of downlink data supplied by said cable, said information including one or both of: i) a data accumulation rate (DAR) of a downlink buffer used to store downlink data supplied by said cable and ii) an average data arrival time (ADAT) of the downlink buffer;
  determine, at the base station, a subcarrier spacing (SCS) to be used by the base station to transmit data to one or more wireless devices based on the determined information relating to buffering of downlink data supplied by said cable; and
  operate the base station to use the determined SCS to transmit data stored in the downlink buffer to one or more wireless devices.

15. The base station of claim 14, wherein said processor is configured to:
  make a decision whether to: i) increase a current SCS, ii) decrease the current SCS or iii) leave the current SCS unchanged, as part of being configured to determine the SCS to be used by the base station to transmit data to one or more wireless devices.

16. The base station of claim 15, wherein said processor is further configured to:
  use an initial SCS as the current SCS the first time said step of determining, at the base station, a SCS to be used by the base station to transmit data to one or more wireless device based on the determined information relating to buffering of downlink data supplied by said cable, said initial SCS being a default SCS or an SCS based on a measured transmission latency.

17. The base station of claim 15, wherein said processor is further configured to:
  measure data transmission latency between the modem and base station; and
  select the initial SCS based on the measured data transmission latency between the modem and base station.

18. The base station of claim 15, wherein said processor is configured to:
  determine, based on one or both of the DAR and ADAT whether to i) increase the current SCS used to communicate data to one or more wireless terminals, ii) decrease the current SCS used to communicate data to one or more wireless terminals or iii) leave the current SCS being used to communicate data to one or more wireless terminals unchanged, as part of being configured to determine, at the base station, SCS to be used by the base station to transmit data to one or more wireless devices.

19. The base station of claim 18, wherein said processor is configured to:
  determine to i) increase the current SCS used to communicate data to one or more wireless terminals in response to determining that the DAR is less than the first threshold (T1) and that the ADAT is below the second threshold (T2), as part of being configured to determine, at the base station, SCS to be used by the base station to transmit data to one or more wireless devices.

20. A non-transitory computer readable medium including computer executable instructions which when executed by a processor of a base station connected to a modem by a cable cause the base station to perform the steps of:
  determining information relating to buffering of downlink data supplied by said cable, said information including one or both of: i) a data accumulation rate (DAR) of a downlink buffer used to store downlink data supplied by said cable and ii) an average data arrival time (ADAT) of the downlink buffer;
  determining, at the base station, a subcarrier spacing (SCS) to be used by the base station to transmit data to one or more wireless devices based on the determined information relating to buffering of downlink data supplied by said cable; and
  using the determined SCS to transmit data stored in the downlink buffer to one or more wireless devices.

* * * * *